United States Patent Office 2,892,314
Patented June 30, 1959

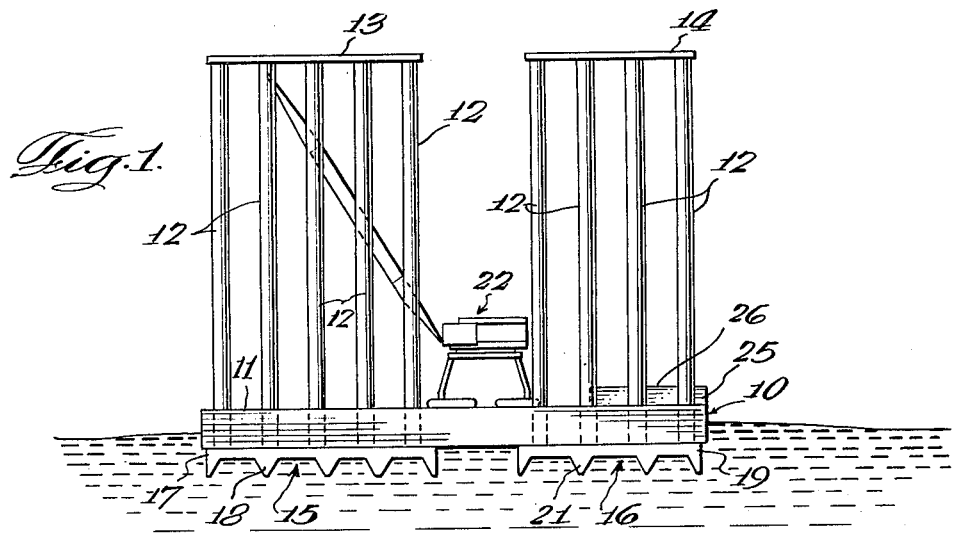
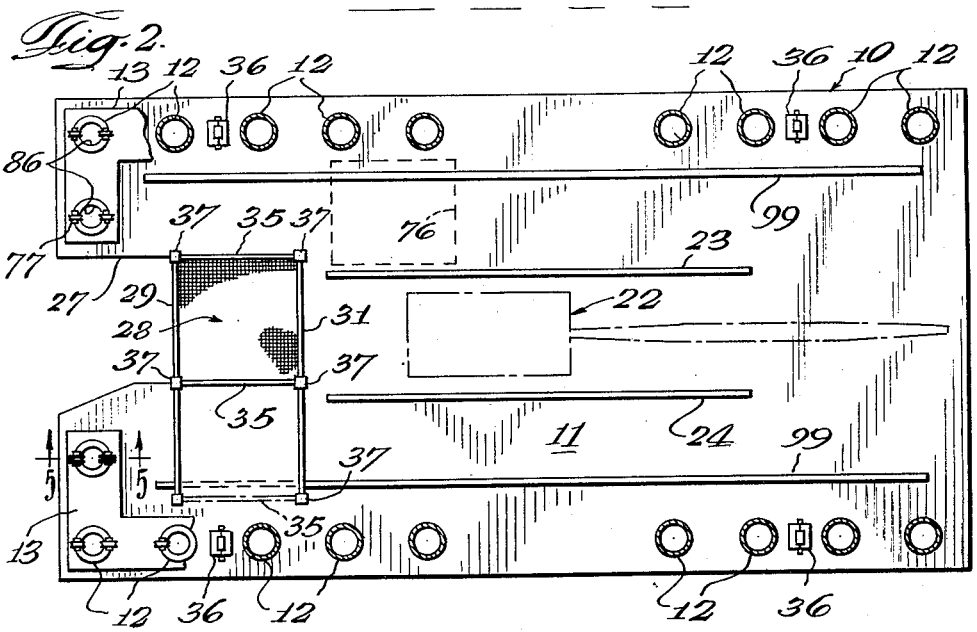
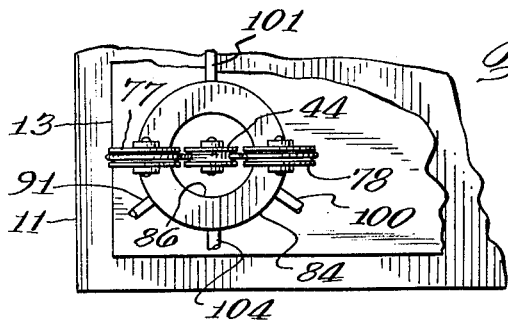

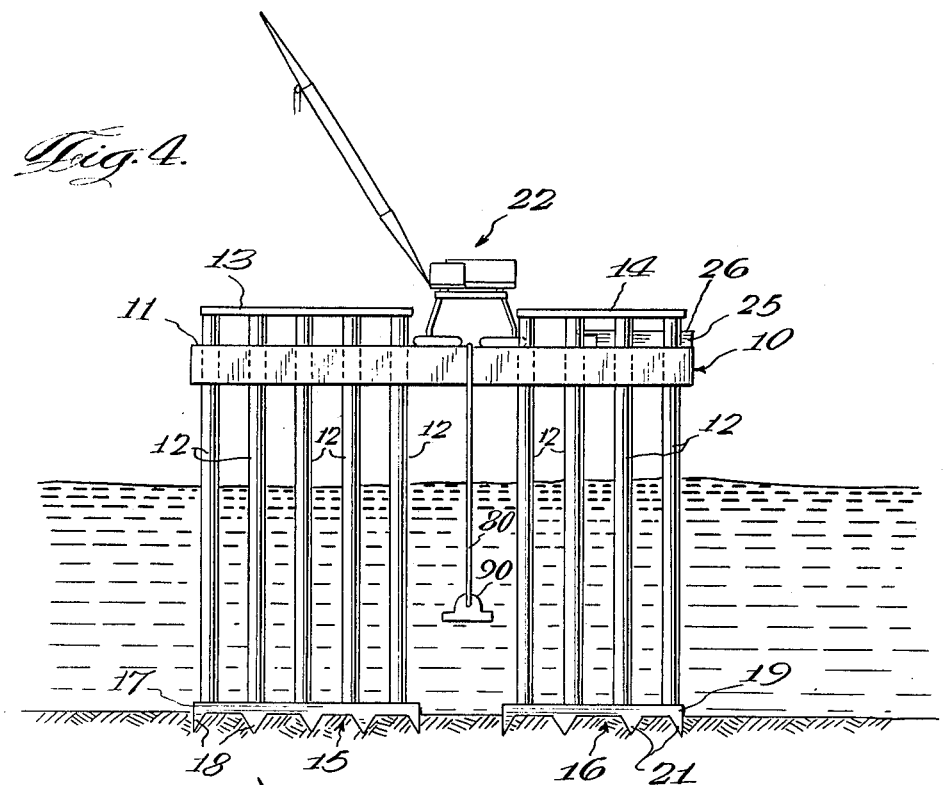
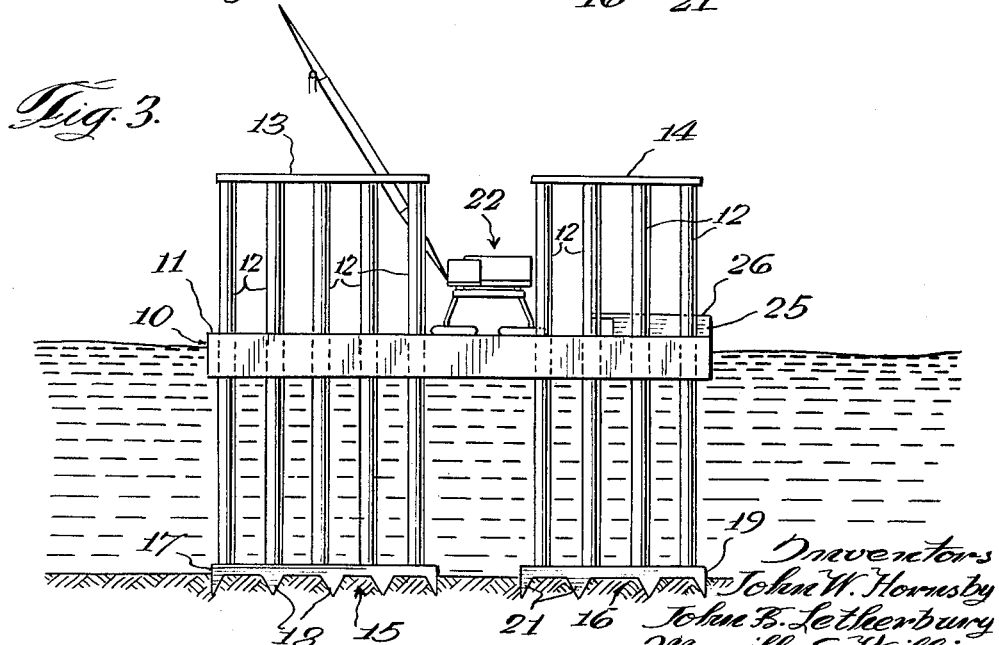

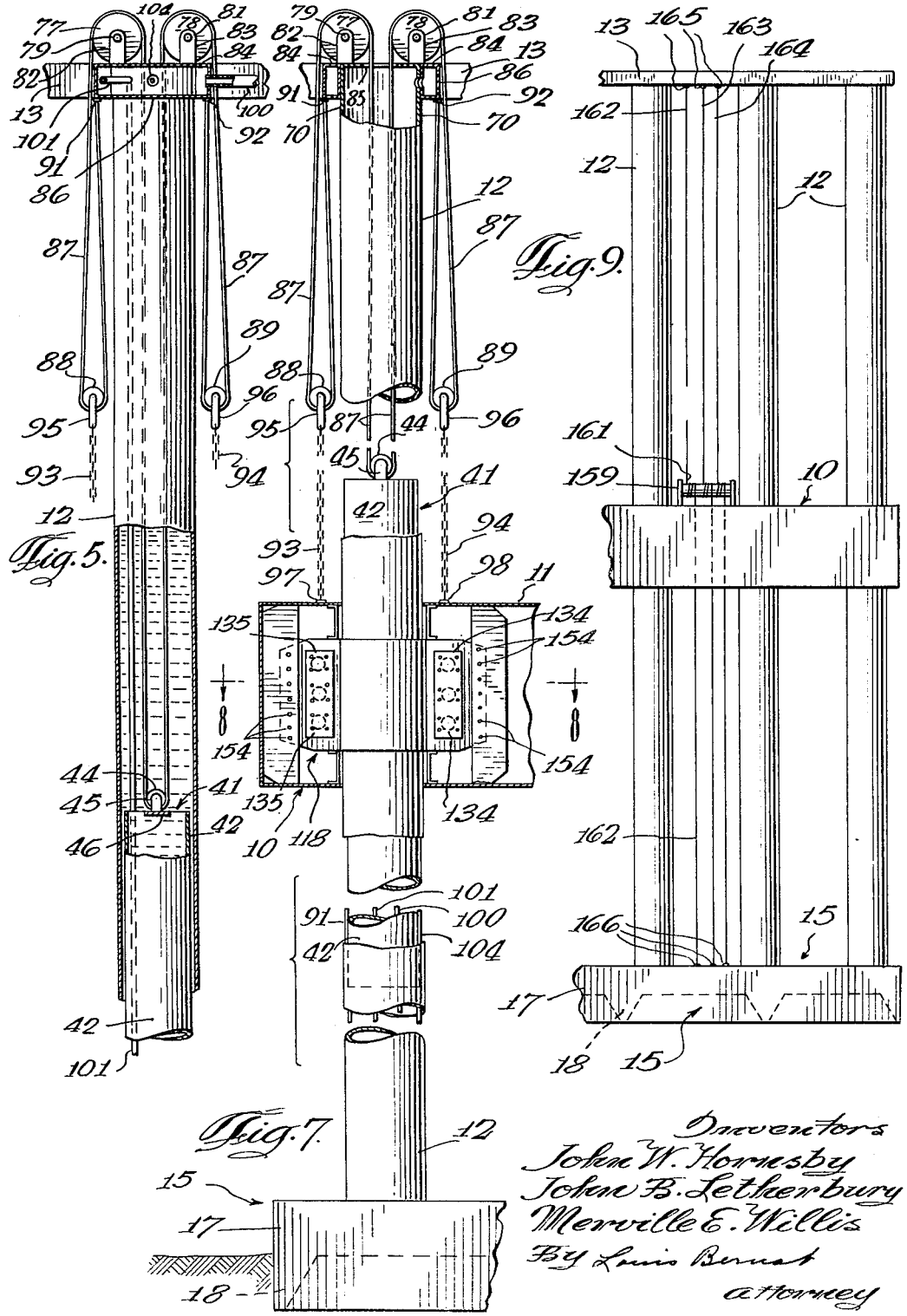

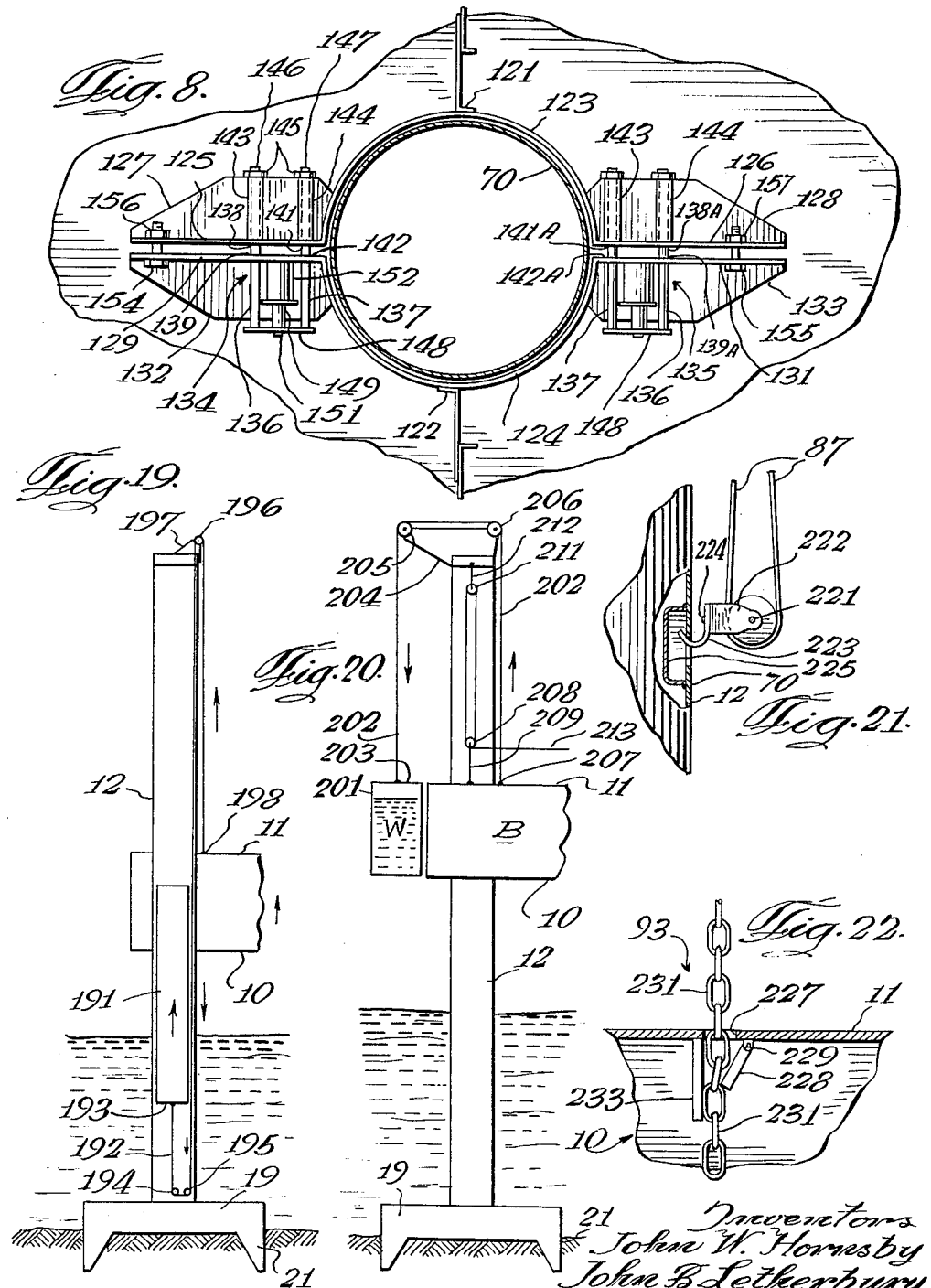

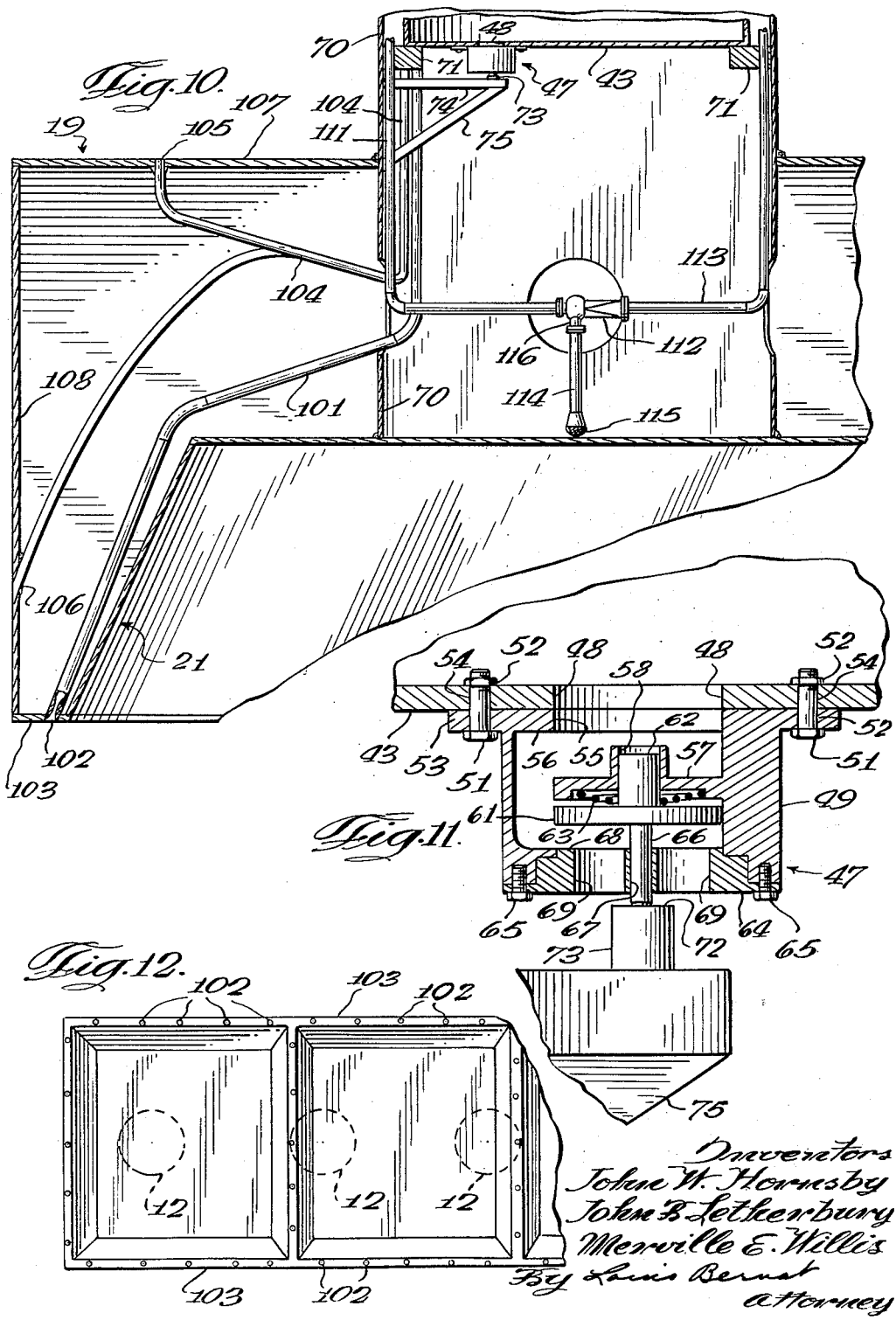

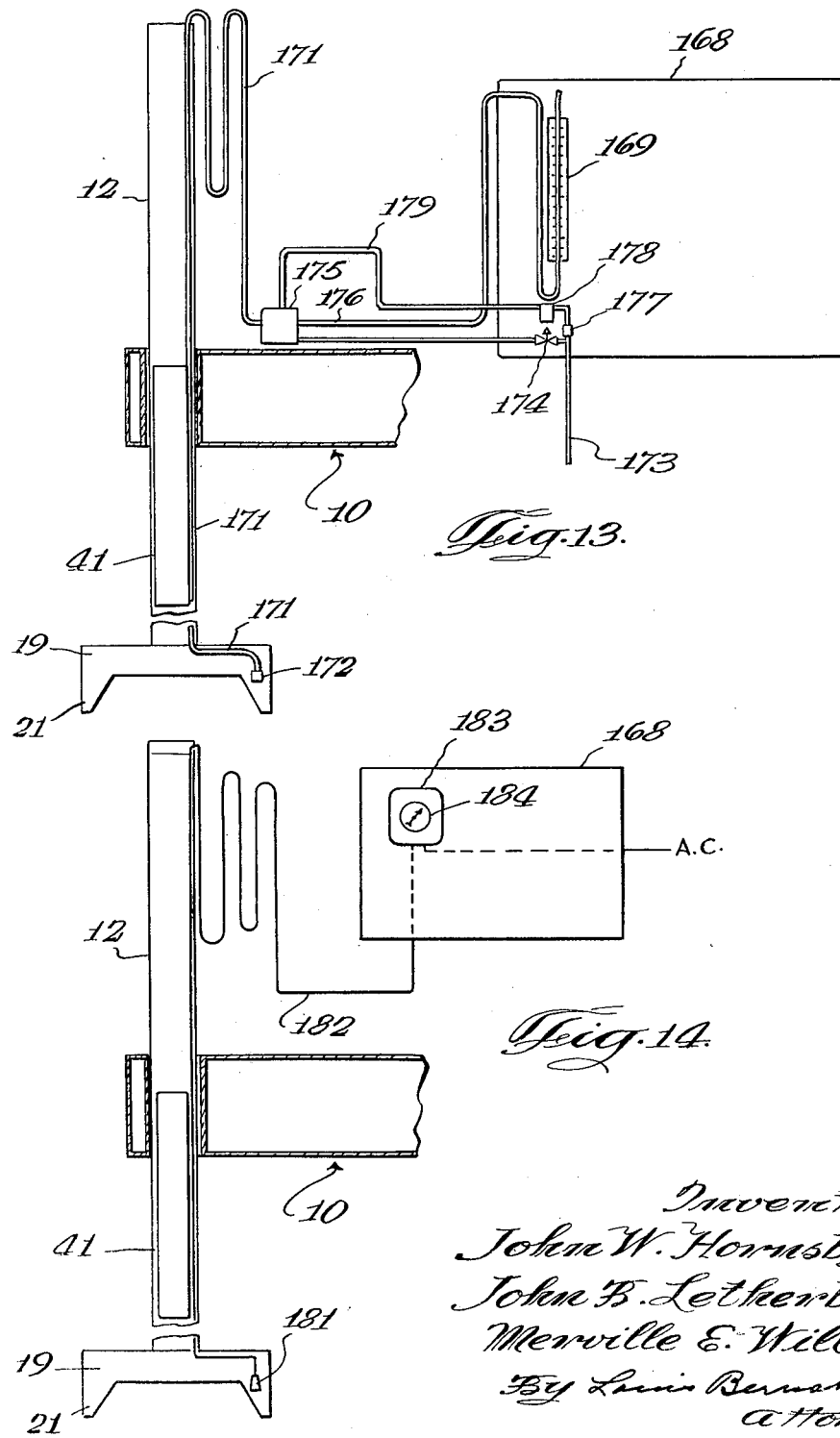

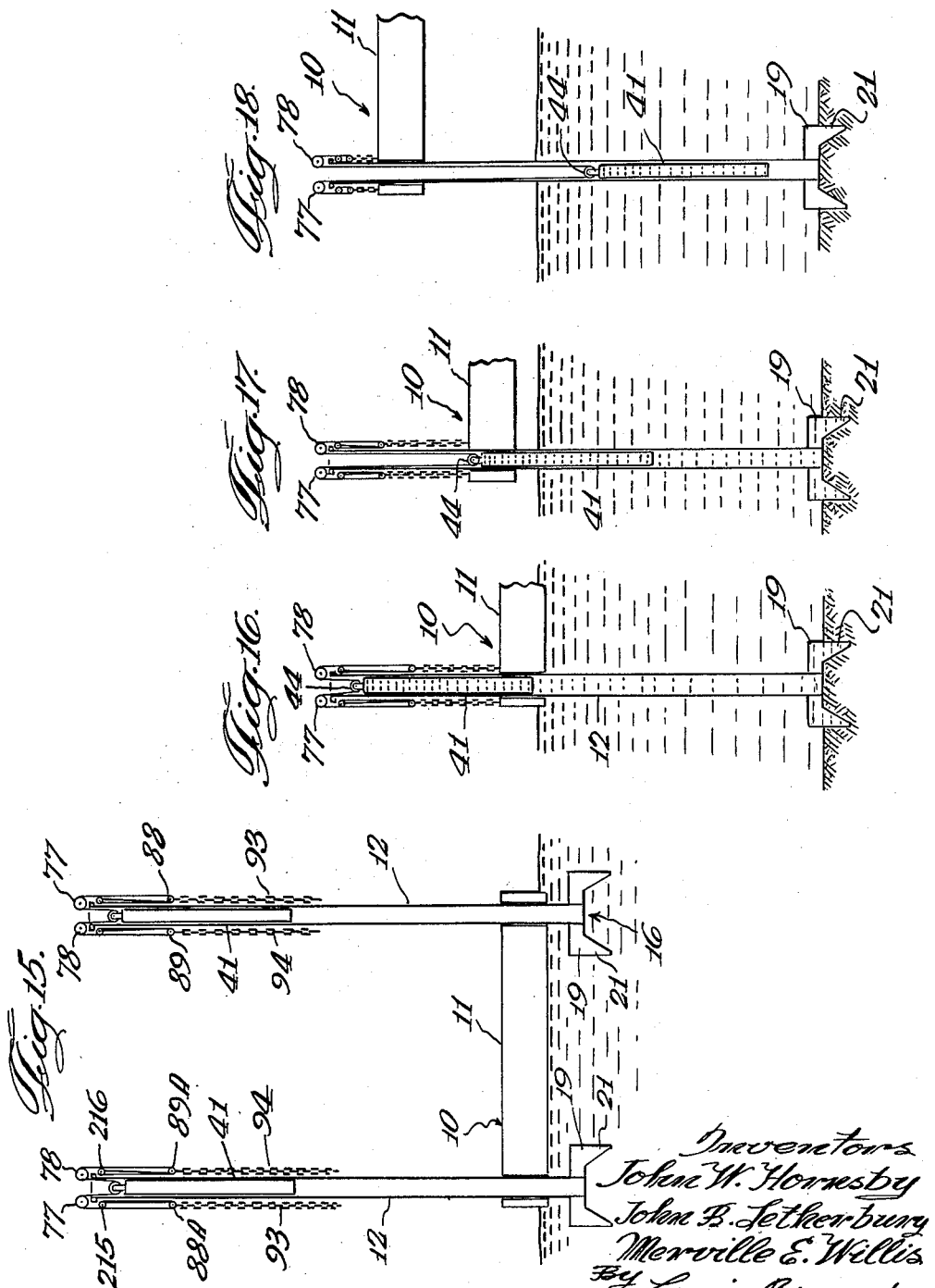

2,892,314
METHOD OF OPERATING AN OFF-SHORE WORKING PLATFORM

John W. Hornsby, Haddonfield, N.J., and John B. Letherbury, Glenside, and Merville E. Willis, Philadelphia, Pa., assignors to New York Shipbuilding Corporation, a corporation of New York Application December 27, 1954, Serial No. 477,607

2 Claims. (Cl. 61—46.5)

This invention relates to off-shore working platforms, and more particularly to such platforms in which the platform working surface can be raised above the water.

A problem which has long faced deep water builders and drilling rig operators is how to transport and erect an off-shore working platform in a minimum amount of time and with the minimum amount of equipment and weighty fixtures.

One solution which has been found to be an excellent one is to raise a barge onto spuds or legs which are stowed on the barge during transit. The present invention improves this general solution by providing for a plurality of hollow columnar legs, each carrying a barge counter-balancing and internal weighting system which is externally instrumented and actuated to firmly place the caisson terminated column into the ocean bed and then raise the barge upward along the columnar structure.

This erecting mechanism is an integral part of the combination barge and working platform structure and is relatively simple and quick to operate. The reverse abandoning of the site is similarly simplified by the self-contained erecting structure.

Accordingly, it is an object of this invention to provide a new and improved off-shore working platform.

Another object of this invention is to provide an improved off-shore working platform which can be floated to the site of its use.

Another object of this invention is to provide an improved off-shore working platform which has a self-contained erecting mechanism for raising the barge's working surface from the level of the water.

Another object of this invention is to provide an improved off-shore working platform in which during raising or lowering of the barge the weight of the barge is balanced by a counter-weight arrangement.

Another object of this invention is to provide an improved erecting mechanism for an off-shore working platform which is simple in design, relatively low in weight, and easy to operate while requiring a minimum of easily accomplished maintenance.

Another object of this invention is to provide an improved off-shore working platform in which column-like legs firmly support the barge working surface above the ocean bed.

Still another object of this invention is to provide an improved off-shore working platform in which the column-like supporting legs are provided with a shaped locking device enveloping a portion of the column perimeter for locking the barge working surface above the ocean bed.

A further object of this invention is to provide an improved off-shore working platform in which the column-like supporting legs are provided with jet-containing caisson cutting edges, which jets aid in both seating and unseating the legs in the ocean bed.

A still further object of this invention is to provide an improved off-shore working platform in which an instrumentation system will indicate at all times the water level in the column-like legs.

Other objects and advantages of the invention will become apparent during the course of the following description when read in connection with the accompanying drawings, wherein:

Figure 1 is an elevational view showing some of the major features of the off-shore working platform with the platform in its transport condition;

Figure 2 is a partially broken-away top view of Figure 1 showing some of the major features of the invention;

Figure 3 is a side elevational view similar to Figure 4, but with the barge at the level of the water line;

Figure 4 is a side elevational view of the invention showing the barge in a raised position on the columns.

Figure 5 is a partially broken away elevational view of the upper portion of one of the columns, taken at section line 5—5 of Figure 2;

Figure 6 is a top view of one of the columns;

Figure 7 is a partially broken away elevational view of one of the columns showing the relationship and manner of connection of the barge to the column;

Figure 8 is a sectional view taken through the column at line 8—8 of Figure 7, showing details of the locking grip arrangement which clamps the barge to the column when desired;

Figure 9 is an elevational view of a portion of the working platform showing the winch arrangement which permits raising or lowering the barge along the columns;

Figure 10 is a cross-sectional view of a portion of a caisson and a portion of the column adjoining the caisson showing the cutting edge, jet and column educting structure;

Figure 11 is a cross-sectional view of the spring loaded, trip-operated unloading valve at the bottom of the counter-weight containers;

Figure 12 is an enlarged bottom view of a portion of a cutting edge caisson;

Figure 13 shows a pneumatic instrument system for indicating the height of the liquid in the barge supporting columns;

Figure 14 shows an electrical instrumentation system for indicating the fluid level in the barge supporting columns;

Figures 15 through 18 illustrate the various steps in the operation of the raising or lowering of the barge along the caisson column;

Figure 19 is a cross-sectional view of a column showing a first alternate counter-weight scheme;

Figure 20 is a view of a column illustrating a second alternate counter-weight scheme;

Figure 21 shows the hooks of one of the double blocks lodged in its flush socket on the column; and Figure 22 is an enlarged view of the chain stopper structure in the working surface of the barge.

Referring now more particularly to Figures 1 and 2, there is shown a barge hull 10 having an upper working surface 11. Twenty circular caisson columns 12, which are 175 feet long in the typical embodiment, pierce the hull 10 in four distinct groups. Two of these groups, consisting of six columns each, are arranged in an L-shaped pattern at the aft end of the rectangular hull, while the other two groups, consisting of four columns each, are positioned on each side of the bow end of the hull 10.

The upper ends of the columns within each of the four groups 12 are connected together by steel plates 13 at the aft end, and steel plates 14 at the bow end of the barge. The lower ends of the four groups of columns are each joined together below the barge hull 10 by two rectangular caissons 15 and two rectangular caissons 16 at the aft and bow ends of the barge respectively.

The caissons 15 consist of hollow plates 17 from which protrude a plurality of hollow cutting edges 18, while the caissons 16 consist of hollow plates 19 from which protrude a plurality of hollow cutting edges 21. As shown in Figure 1, the columns 12 and their associated structures are in their transporting position.

A gantry crane 22 is movably positioned on two tracks 23 and 24. In the typical embodiment the gantry crane is diesel driven and has a 120 feet boom. It is rated at 5 tons at a 120 feet radius and 35 tons at a 50 feet radius.

Housing for the crew is provided within a steel walled enclosure 25 having a roof 26.

The barge is arranged with a slot 27 at the aft end over which may be located a derrick 28 slidable on two portable tracks 29 and 31, which may be laid across the end of the slot 27. The portable tracks 29 and 31 are spaced apart by separators 35, which are fastened to the tracks by connector 37.

When the platform is used for oil drilling purposes and it is desired to put a permanent production platform on the well-head, the derrick is skidded off the slot 27 onto the deck beside the slot. The production platform, which is usually fabricated on shore and then brought to the drilling barge, is thereafter placed in position around the well head by the gantry crane 22. Piling is then driven through the legs of the production platform and an upper section is added on to bring the platform to its desired height above the water level. The portable tracks 29 and 31 are then removed and the barge lowered and moved to another site.

Four mooring winches 36 are positioned, two fore and two aft, on the working deck 11. These winches may be used to raise or lower the barge 10 along the columns 12. The preferred manner for raising or lowering the barge will be described hereafter.

Figure 3 shows the structure of Figure 1 with the columns 12 released and filled with water, as will be explained later on, so as to come to rest and cut into the surface of the ocean bed.

Figure 4 shows the structure of Figure 3 with the barge raised along the columns, in a manner shortly to be described, so as to raise the barge above the water line.

Referring now to Figures 5, 6 and 7 for the basic embodiment of the counter-balancing mechanism, which causes a counter-weight to exert a force opposite to the downward force of gravity acting on the barge as the barge is raised or lowered, there is shown one of the columns 12 within which is contained a counter-weight container 41. The counter-weight container 41 consists of a cylindrical steel shell 42 closed at the bottom by the plate 43 (see Figs. 10 and 11). A pulley sheave 44 is fastened by its bracket 45 to a rib-like structure 46 at what may be described as the hub of a spoke-like lattice connected across the top of the container 41.

As is best seen in Figures 10 and 11, a spring biased, trip-operated unloading valve 47 is attached to cover an aperture 48 in the bottom 43 of the container 41. A valve housing 49 is fastened to the container bottom 43 by means of bolts 51 and mating nuts 52 which pass through holes 54 in the flanged perimeter 53 and in the container bottom 43. An aperture 55 in the bottom 56 of the valve housing cover is lined up with the aperture 48 in the container bottom 43.

A mounting plate 57 having an aperture 58 therethrough extends from the valve housing 49. A valve closure member 61 has a shaft 62 slidably positioned in the aperture 58. A spring 63 is positioned between the valve cover member 61 and the plate 57 tending to force the valve cover member 61 outward toward a valve housing closure 64. Closure 64 is fastened by means of bolts 65 to the sides of the valve housing 49.

A shaft 66 extends from the valve cover member 61 through an aperture 67 in the plate 64. Shaft 66 si slidably positioned in the aperture 67. When valve cover member 61 is forced by the spring 63 against the inner housing surface 68 of the plate 64, which acts as a valve seat, it effectively seals an aperture 69 in the plate 64. When the counter-weight container reaches its lowest point of travel in the column 12, as determined by the stop 71 which juts out into the hollow interior of the column from the column wall 70 to which it is fastened as by welding, the unloading valve 47 is tripped into its open position. The switch actuation surface is provided by the face 72 of a block 73 which is fastened to an angle supporter consisting of two members 74 and 75 which jut out from the column wall to converge to a common end. As the container bottom 43 comes to rest on the stop 71, the face 72 of the block 73 bears against the end of the shaft 66 to force the cover member 61 away from the valve seating surface 68.

Two pulley sheaves 77 and 78 are mounted on respective pins 79 and 81 which in turn are mounted in respective bracket pairs 82 and 83. The bracket pairs 82 and 83 are fastened to a cover plate 84 having a central aperture 85 which is positioned across the top of the column 12. The cover plate 84 extends beyond the side wall 70 of the column 12 and has connected to it a circumferential skirt-like flange section 86, which together with the extension of the cover plate 84 beyond the column wall 70 forms a circumferential enclosure around the side wall 70 which is rectangular in cross-section. In the present embodiment the steel plates 13 and 14 are joined to the flange sections 86 of the columns which they interconnect, though another location near the top of the column is equally satisfactory.

The counter-weight container 41 is lifted by a wire rope 87 which passes under the sheave 44 on the counter-weight container, and over the two sheaves 77 and 78 at the top of the column 12. The ends of the wire rope 87 are then reeved through their respective blocks 88 and 89 and attached to the skirt-like section 85 by their respective sockets 91 and 92. Links 95 and 96 are connected to their respective blocks 88 and 89. Respective chains 93 and 94 are led from their respective links 95 and 96 through their respective chain stoppers 97 and 98 in the upper barge surface 11.

In an alternative embodiment, which is illustrated in connection with Figures 15–18, the ends of the wire rope 87 are reeved through respective double blocks 88A and 89A, and respective single blocks 215 and 216 before being attached to the skirt-like section 85 by their respective sockets 91 and 92. It should be understood that the number of parts in the tackle may be varied to provide any desired mechanical advantage.

The columns 12 may be filled with water from the mud pumps 76. The mud pump suction is supplied with sea water through a flexible hose 80 from a deep-well pump 90 lowered from the barge 10 (see Fig. 4). The discharge of the pump is connected to two pressure mains 99, one starboard and one port, running along the deck of the barge 10 (see Fig. 2). At each column there is a flexible hose from the main to a manifold at the top of the column (not shown). The manifold terminates in a pipe 100 which discharges into the column and is directed in nozzle-like fashion to fill the counter-weight container with water and, by overflow from it, the column.

The manifold also has a discharge to a pipe 101 which runs down the inside of the column to a first group of jets 102 in the bottom surface 103 of the cutting edges 18 and 21. The jets 102 are used when breaking out the cutting edges or when sinking them into the ocean bed (see also Figures 10 and 12). The manifold has a further discharge to a pipe 104 which runs down inside the column 12 to supply a second group of jets 105 and 106, which pierce the upper surface 107 and the sides 108 respectively of the caissons 15 and 16. This second group of jets which is spaced in a manner similar to jets 102, is primarily used when breaking out the cutting edges and caissons from the ocean bed.

The manifold has another pipe 111 which runs down the inside of the column 12 to supply actuating water to eductors 112, the discharge water from which eductors is carried overboard through a pipe 113. A pipe 114 terminating in a foot valve and strainer 115 is connected to the suction coupling 116 of eductor 112. Each column is provided with a clamp 118 which, being fixed to the barge 10, permits clamping the barge to the column.

Referring now to Figure 8 for details of the clamping arrangement, it is seen that fixed to two barge structure members 121 and 122 are two semi-cylindrical shells 123 and 124, respectively, which envelop the column wall 70. The semi-cylindrical shell 123 flares out into two flat sheet-like sections 125 and 126 which are braced by their respective sheets 127 and 128 connected at right angles to their respective sheet sections 125 and 126, and a portion of the semi-cylindrical shell 123. The semi-cylindrical shell 124 also extends in two sheet-like sections 129 and 131, which are spaced parallel to the respective sheet sections 125 and 126. Sheet sections 129 and 131 are braced at right angles by members 132 and 133 in the same manner as sheet sections 125 and 126.

Three pairs of hydraulic locking grips 134 and 135 are provided, one of each pair for the parallel sheet sections 125 and 129 and the other of each pair for the parallel sheet sections 126 and 131. Only a single pair of locking grips 134 and 135 will now be described, since the other pairs are alike in structure. A first pair of rods 136 and 137 are movably positioned at right angles through mating apertures 138, 139 and 141, 142, respectively. These apertures are in the parallel sheet sections 125 and 129, respectively. A second pair of rods 136 and 137 are similarly positioned at right angles through mating apertures 138A, 139A and 141A, 142A, respectively, which are in the parallel sheet sections 126 and 131.

Tube-like spacers 143 and 144 are placed over the two pairs of rods 136 and 137, one pair bearing against the sheet section 125 and the other pair bearing against the sheet section 126. Spacers 143 and 144 are held against ther respective sheet sections 125 and 126 by bolts 145, which are threaded onto the respective ends 146 and 147 of the rods 136 and 137. A plate 148 is fastened to the other end of each pair of rods 136 and 137. One end of a piston 149 is fastened to each plate 148 by a bolt 151 which is threaded into the end of the piston. The other end of the piston is slidably positioned in a cylinder 152 which extends outward, one each, from the sheet sections 129 and 131.

In operation hydraulic fluid is forced through an opening (not shown) into each of the hydraulic cylinders 152. This forces the pistons outward causing the plates 148 to carry the rods 136 and 137 in the same direction. As a result, the parallel sheet sections 125, 129 and 126, 131 are forced together. Consequently, the semi-cylindrical sections 123 and 124 tighten around the column wall 70, forming a pressure tight connection between the barge 10 and the column 12. A group of bolts 154 and 155 cooperating with bolts 156 and 157 respectively, can be used to mechanically force the sheet sections 125, 129 and 126, 131 together so as to clamp the barge 10 to the column wall 70.

Referring to Figure 9 for a description of the lifting equipment, there is shown a winch 159 equipped with a drum 161. The winch 159 may be driven by any of the well known alternative mechanical or electrical means, such as a hydraulic motor. Three wire ropes 162, 163 and 164 are connected to the upper plate 13 by sockets 165. The wire ropes run from the top of the caisson column plate 13 around the drum 161 to sockets 166, fastened into the plates 17 of the caisson 15. One winch 159 is provided for each of the four groups of columns 12. In operation a winch motor (not shown) turns the winch 159 to either raise or lower the barge 10 along the column 12.

Referring now to Figure 13 for a description of the pneumatic instrumentation system which indicates the level of the water in the caissons 15 and 16, and the columns 12, there is shown a control board 168, one for each column, which may be mounted in any convenient place adjacent to the column 12 with which it is to be used or in some central location common to all the control boards for the columns 12. On the control board is mounted a mercury, or other liquid, column indicator gage 169, which has its scale graduated to indicate the height of the water in the column from the lowest point of the down pipe 171. The down pipe 171 is positioned in the caisson with its open end pointing downward. This down pipe may terminate in an air bell 172. Air is provided to this down pipe from an air supply pipe 173 through a blow valve 174 and a snubber 175. The mercury indicator gauge is connected to the snubber by a pipe 176. This system operates pneumatically by balancing the rise of water in the column 12 against the rise of mercury in the gauge 169. The rise of water in the column 12 tends to compress the air in the down pipe and thus makes the mercury column rise in the gauge 169.

The gauge 169 is placed in operation by adjusting the blow valve 174 to a pressure slightly in excess of the maximum pressure to be read. The over-pressure is released by the air bubbling from the air bell 172 upward through the water in the column 12. The release of any over-pressure assures that the pressure in the down pipe 171 is directly related to the height of the water in the column 12.

The snubber allows air to constantly flow into the down pipe 171 but if this flow of air should fail, a bubbler trap 177 traps the oil. The bubbler 177 is connected through a sight feed bubbler 178 and a pipe section 179 between the air supply line 173 and the air snubber 175. The sight feed bubbler, as is well known in the art, indicates visually that air is flowing from the air supply pipe 173 to the down pipe 171.

Figure 14 shows an alternate system for indicating the water level in the column 12. In this system a pressure transmitter 181 consisting of a pressure sensing instrument of the Bourdon tube pressure type driving an armature of a generator, which armature is coupled directly to the tip of the Bourdon tube, generates an alternating current signal whose amplitude is a function of the position of the armature in its alternating current excited field. Since the position of the armature varies as a function of the pressure applied to the Bourdon tube, the flat sides of which tube tend to take a more circular cross-section causing the tube to straighten out somewhat with increasing pressure, the armature produced alternating current signal is a function of the pressure sensed by the Bourdon tube. Noting that the water pressure acting on the Bourdon tube is directly proportional to the height of the water in the column 12, it is readily seen that the output signal from the pressure transmitter 181 is a function of the height of the water in the column.

A cable 182 containing three leads runs from the transmitter 181 to an electrical receiver housing 183 on the control board 168. One of the leads carries the alternating current excitation signal for the field of the transmitter generator, a second lead carries the generated signal to the electrical receiver, and the third lead is a common ground lead used for both of these signals. The generated signal is applied to a voltage sensing position indicator meter 184 mounted in the front of the receiver housing 183. The position indicator meter 184 is directly calibrated to indicate the depth of water in the caissons.

Referring now to Figures 15 through 18 for a detailed description of the procedure in lifting the barge from its transport condition to its raised condition, it will be assumed that the barge has arrived at the working site with:

(1) All the columns 12 raised and empty;
(2) The clamps 118 are secured;
(3) The containers 41 are dry and each is at the same level relative to and near the top of its column 12;
(4) The blocks 88A and 89A are secured to the columns 12 by hooks 223 lodged in flush sockets 225 on the columns (described in detail below);
(5) The chains 93, 94 hang from the blocks;
(6) The hoses from the pressure mains 99 to the manifold (not shown) are in position at the top of each column. The initial condition of the barge and columns is shown in Figure 15.

The procedure for raising the barge will then be as follows:

(1) Release all the clamps 118 simultaneously so that each group of columns with its base sinks to its equilibrium level;
(2) Using the flexible hoses connected to the discharge from the mud pumps 76 and taking suction from the sea through the salt water supply pump 90 fill the counterweight containers 41. When these are full, fill with the overflow the caissons 15, 16 and then the columns to about the level of the top of the containers 41 (Fig. 16);
(3) Secure the chains 93 and 94 to the barge hull 10 with the chain stoppers 97 and 98;
(4) Using a line over the gypsy heads (not shown) to any point on the chains 93 and 94 in succession, disengage the hooks 223 of the blocks from the flush sockets 225. The weight in water of the steel counter-weight containers is thus transferred from the flush sockets on the columns to the chains 93, 94 and their respective sockets 97, 98 in the upper surface 11 of the barge 10;
(5) Secure all the clamps 118;
(6) Turn the manifold valves (not shown) so the discharge from the mud pumps 76 goes into the pipes 111 to activate the eductors 112, instead of the filling nozzles 100;
(7) Educt the water from the columns and their caissons 15, 16 down to the lever to which the eductors will operate as determined by the location of the foot valves and strainers 115;
(8) Release the clamps;
(9) Raise the barge using the winches 159 until the spring loaded valves 47 are about to be actuated (Figs. 17 and 18);
(10) Secure the clamps 118 as soon as the spring loaded valves 47 are opened. Water in the counterweight containers 41 now runs into the cutting edges 18, 21;
(11) Take a line from the gypsy head on the winches (not shown) to the blocks 88, 89 or 88A, 89A, depending on which embodiment is being used;
(12) Haul the blocks down until the counterweight is at its original level near the top of the column;
(13) Secure the chains 93 and 94 in the chain stoppers 97 and 98;
(14) Flood the counterweight containers 41;
(15) Release the clamps 118;
(16) Raise the barge 10 to its next position when the spring loaded valves are about to open by operating the winches 159;
(17) Repeat Steps 10 through 16 until the barge is raised to its desired height.

It should be noted that at any time when the hoses are not used for educting or filling the columns 12, they may be made to discharge through pipes 101 to the cutting edge jets 102. After the barge has been raised to its final position, the clamps are mechanically set by tightening the nuts 156 and 157 on their respective bolts 154 and 155. If the raising has been stopped before the counterweights reach their valve tripping position, i.e. reach the tripping point of the spring loaded valves 47, the columns 12 should be partially filled with water till covering the counter-weight containers, after which the chains 93, 94 are disconnected with the gypsy heads and the counterweight containers 41 lowered to the bottom.

The water may then be removed from both the columns 12 and the counterweight containers 41. Should it be desired to vary the loading of the column on the ocean floor, the bearing pressure of the cutting edge caissons 15, 16 can be varied by controlling the amount of water in the caisson cutting edges and the columns. The maximum loading, of course, is obtained when both the columns and containers are completely filled with water. On leaving the working site, the following operating procedure is to be used:

(1) Draw off the water, if any, from the columns, using the eductors 112.
(2) Engage the clutches on the drums of the winches (not shown).
(3) Release the clamps 118.
(4) Lower the barge till the counterweight containers 41 are at the top of their respective columns 12 using the winches 149.
(5) Clamp the barge by actuating clamps 118.
(6) Fill the columns with water.
(7) Loosen the chains 93, 94 from the chain stoppers 97 and 98.
(8) Using the line from the gypsy head, slack off the blocks 88 and 89 until the counterweight containers 41 are almost to the trip position of the valves 47 but not far enough to trip the spring loaded valve.
(9) Secure the chains 93, 94 in the chain stoppers 97 and 98.
(10) Exhaust the water from the columns 12.
(11) Release the clamps 118.
(12) Lower the barge again by repeating Steps 5 through 11 as often as is necessary.
(13) Secure all the clamps.
(14) Fill the columns to the top with water.
(15) Engage a line from the gypsy heads and release the chains 93, 94.
(16) Using the lines from the gypsy head, slack the blocks off to the top of the column, thus permitting the containers 41 to go to the bottom, and trip their spring loaded valves 47.
(17) Using the eductors 112 evacuate the water from the columns.
(18) Hoist the blocks back down so the containers 41 are at the top of the columns.
(19) Engage the hooks into their flush sockets 225 in the column walls 70.
(20) Fill the columns half-way with water.
(21) Release the clamps 118, ballast the barge down, and then engage the clamps again at the low tide.
(22) Discharge the ballast at the high tide and release the clamps.
(23) Pump out all the columns. They are now at the equilibrium level existing after Step 1 of the barge raising procedure set forth above.
(24) The columns are raised until their cutting edge faces are against the barge hull by using the winch drums 159.

It should be noted that Steps 21 and 22 make use of the tide to provide additional freeing force for the caissons.

Referring now to Figure 19 for the first alternate counter-weight scheme, the counter-weight container in this case is an air filled cylinder 191 which is connected to the barge 10 by a cable 192 which runs from the lower end 193 of the air cylinder and downward around a pair of pulleys 194 and 195 which reverse the direction of the cable. The cable then runs upward to the top of the column 12. Here its direction is again reversed by a pulley 196 which is mounted to a bracket 197 on top of the column 12. The downward running cable 192 terminates in a chain stopper 198 in the upper surface 11 of the barge 10. The chain stopper 198 is similar in construction to the chain stoppers 97, 98. During the time that the air cylinder is effective to counterbalance the barge 10, the column 12 is filled with water. The air cylinder 191 tends to rise in the water exerting an upwardly directed force on the cable 192 connected to its bottom 193. This force is effective to oppose the downward directed force due to the weight of the barge 10. Thus the cylinder 191 acts as a counter-weight to the gravity force acting on barge 10.

Figure 20 illustrates a second alternate counter-weight scheme utilizing a constant mass counter-weight container which is filled with a liquid such as water. The counterweight container 201 is freely suspended from a cable 202 which is attached to the upper end 203 of the counter-weight container 201.

A bracket 204 is fixed to the top of the column 12. Two pulley sheaves are rotatably mounted on bracket 204. The cable 202 passes over the pulley sheaves 205 and 206 which reverse the direction of the cable to direct it through a chain stopper 207, similar to chain stoppers 97 and 98, below which it terminates. As is readily seen, the counter-weight 201 counter-balances the weight of the barge 10. A pulley system consisting of a pulley 208 connected by a mounting fixture 209 to the surface 11 of the barge 10, and a pulley 211 connected by a mounting fixture 212 to the top of a column 12, is used to obtain the desired mechanical advantage so as to limit the force which needs to be exerted by the power winch (not shown) on the lifting cable 213.

It is to be understood that sand or gravel may be substituted for the counter-balancing fluid in the container 201 to permit reduction in the size of the container 201 without loss in the counter-balancing force exerted by the container. Also, the fixed-weight counter-weight arrangement of Figure 20 may be combined with the internal column counter-weight arrangements disclosed as being within the scope of this invention.

Reference is now had to Figure 21 for details of the securing means for the blocks 88, 89 or 88A, 89A, depending on which type of rigging arrangement is used. Fastened to each of the blocks by means of their sheave pins 221 is a bracket 222. Rotatably mounted across the end of each bracket 222 is a hook 223, connected to its bracket by a rivet 224. The hooks 223 are shaped to engage sockets 225 which are recessed into their columns 12, one for each hook 223. The portions of the sockets 225 which are engaged by the hooks 223 are the column walls 70, thus causing the sockets to be flush with the surface of the columns 12.

Figure 22 shows the chain stopper structure 97, 98 which locks the chains 93, 94 to the deck surface 11 of the barge 10. The chains 93, 94 are led through individual apertures 227 in the deck 11. A chain stopper 228 is hinged in a mounting 229 and can be rotated to protrude through any of the chain links 231 of the particular chain 93, 94 which hangs through its associated aperture 227. The chain stopper 228 in its locked position engages the ledge 232 which is part of the deck 11. Structural support for the ledge 232 is provided by a partition 233 of the barge 10 which is connected to deck 11 near the ledge 232.

While there has been shown and described an invention in connection with certain specific embodiments, it will be understood that it is not wished or intended to be limited thereto since it is apparent that the principles herein disclosed are susceptible of numerous other applications and modifications may be made in the structural arrangement and in the instrumentalities employed without departing from the spirit and scope of this invention as set forth in the appended claims.

We claim as our invention:

1. A method of raising an off-shore working platform along hollow fluid-fillable column-like supporting legs having counter-weight hollow cylindrical containers having spring biased trip operated unloading valves attached thereto and positioned in each of said column supporting legs fastened by flexible pulley connected means to said working platform, and the lower portion of said legs group connected to a unitary caisson base comprising the steps of releasing simultaneously hydraulic clamping devices connecting said platform to each of said supporting legs so that said caisson base sinks to a level predetermined by the weight and buoyancy of the empty column supporting legs of the connected caisson base, filling said column supporting legs with water so that the caisson base will incrementally sink and locate on the bottom of the ocean floor, removing the water from the said column supporting legs, raising said working platform along said columns until said counter-weight containers contact the bottom of said columns so as to actuate said spring biased trip operated unloading valves, removing the water from said column supporting legs and discharging the fluid from said counter-weight containers, unfastening said pulley connecting means from said working platform, raising said counter-weight containers to the upper end of their column supporting legs, fastening said pulley means to said working platform and proportionately filling said column supporting legs and said containers with water so as to counter-balance the working platform on said supporting legs.

2. A method of lowering an off-shore working platform along for a plurality of hollow fluid-fillable column-like supporting legs having the lower portion of said legs group connected to a unitary caisson base and counter-weight movable containers having a fluid trip valve connected thereto slidably positioned within each of said column supporting legs and connected by associated pulley structures to said working platform, comprising the steps of removing the water from said column supporting legs, fastening the associated pulley structures at a fixed distance to said working platform, releasing the hydraulic clamping devices affixed to the working platform and circumferentially positioned around each of said column supporting legs, clamping said hydraulic clamping devices, filling said column supporting legs with water, releasing said associated pulley structures with reference to said platform and lowering said counterweight containers within said column supporting legs just below actuation position of its associated trip valves, clamping said associated pulley structures into position, inserting a mechanical interlock between said working platform and said column supporting legs and then progressively repeating the integrated steps until the platform subsequently reaches a predetermined height.

References Cited in the file of this patent

UNITED STATES PATENTS

| | | |
|---|---|---|
| 854,329 | Charron | May 21, 1907 |
| 1,628,809 | Sandstrom | May 17, 1927 |
| 2,121,743 | Oyen | June 21, 1938 |
| 2,213,485 | Conley | Sept. 3, 1940 |
| 2,489,755 | Czarnecki | Nov. 3, 1949 |
| 2,589,146 | Samuelson | Mar. 11, 1952 |
| 2,592,448 | McMenimen | Apr. 8, 1952 |
| 2,614,427 | Hunter et al. | Oct. 21, 1952 |
| 2,687,017 | Gerwick | Aug. 24, 1954 |
| 2,775,869 | Pointer | Jan. 1, 1957 |

FOREIGN PATENTS

| | | |
|---|---|---|
| 3,927 | Great Britain | of 1868 |